US008300165B2

(12) United States Patent
Yokoyama et al.

(10) Patent No.: US 8,300,165 B2
(45) Date of Patent: Oct. 30, 2012

(54) LIQUID CRYSTAL DISPLAY WITH AN INCREASED APERTURE RATION

(75) Inventors: Ryoichi Yokoyama, Tokyo (JP); Michiru Senda, Tokyo (JP)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 1104 days.

(21) Appl. No.: 12/197,090

(22) Filed: Aug. 22, 2008

(65) Prior Publication Data

US 2009/0096948 A1    Apr. 16, 2009

(30) Foreign Application Priority Data

Oct. 16, 2007  (KR) .................. 10-2007-0104032

(51) Int. Cl.
*G02F 1/133*    (2006.01)

(52) U.S. Cl. ............... 349/39; 349/38; 349/36; 349/37; 345/90

(58) Field of Classification Search ............ None
See application file for complete search history.

(56) References Cited

U.S. PATENT DOCUMENTS

| | | | | |
|---|---|---|---|---|
| 5,986,723 A * | 11/1999 | Nakamura et al. | ............ | 349/39 |
| 6,724,443 B1 * | 4/2004 | Sano et al. | ............ | 349/39 |
| 2004/0094766 A1 * | 5/2004 | Lee et al. | ............ | 257/72 |
| 2004/0263722 A1 * | 12/2004 | Oh et al. | ............ | 349/106 |
| 2008/0136984 A1 * | 6/2008 | Yokoyama et al. | ............ | 349/38 |

FOREIGN PATENT DOCUMENTS

| | | |
|---|---|---|
| JP | 2001-343636 | 12/2001 |
| JP | 2002-098997 | 4/2002 |

OTHER PUBLICATIONS

English Abstract for Publication No. 2001-343636.
English Abstract for Publication No. 2002-098997.

* cited by examiner

*Primary Examiner* — Thanh-Nhan P Nguyen
(74) *Attorney, Agent, or Firm* — F. Chau & Associates, LLC

(57) ABSTRACT

A liquid crystal display includes a pixel group including a first pixel having a first thin film transistor and a second pixel having a second thin film transistor. A gate line provides a driving signal to a gate of the first and second thin film transistors. A first storage capacitor line is arranged substantially parallel with the gate line and adjacent to one side of the first pixel. A second storage capacitor line is arranged substantially parallel with the gate line and adjacent to an opposite side of the first pixel. The liquid crystal display includes a first storage capacitor arranged in the first pixel and connected between the first thin film transistor and the first storage capacitor line. A second storage capacitor is arranged in the second pixel and is connected between the second thin film transistor and the second storage capacitor line.

10 Claims, 15 Drawing Sheets

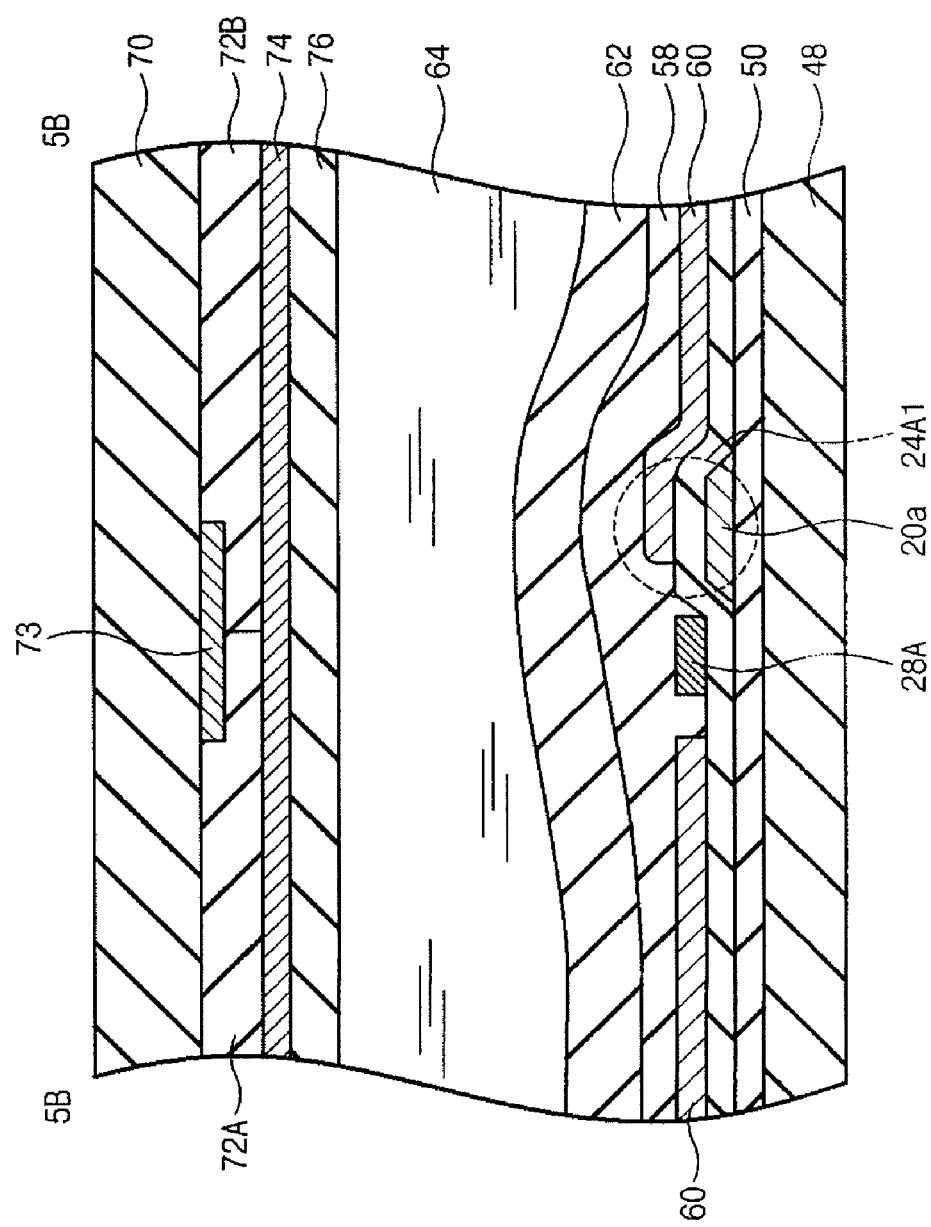

LIQUID CRYSTAL DISPLAY WITH AN INCREASED APERTURE RATION

CROSS-REFERENCE TO RELATED APPLICATION

This application claims priority to Korean Patent Application No. 10-2007-104032 filed on Oct. 16, 2007, the contents of which are herein incorporated by reference in its entirety.

BACKGROUND OF THE INVENTION

1. Technical Field

The present invention relates to a liquid crystal display, and more particularly, to a liquid crystal display with an increased aperture ratio.

2. Discussion of the Related Art

A liquid crystal display (LCD) may control an alignment state of a liquid crystal by driving a thin film transistor (TFT) arranged in each pixel.

A conventional LCD includes a plurality of pixels that are arranged along a predetermined direction in a matrix configuration. Each pixel includes a TFT. The TFT is driven in response to a driving signal provided through a scanning line to a gate thereof. The scanning line is connected to the pixels that are arranged in the predetermined direction. Each pixel also includes one or two storage capacitor lines that are arranged in a direction that is substantially parallel with the scanning line. The storage capacitor lines are connected to the pixels. A storage capacitor is connected between the storage capacitor line and the TFT. Thus, when a voltage is applied to the storage capacitor line, the storage capacitor is charged, thereby maintaining the alignment state of the liquid crystal of each pixel.

However, since the storage lines are extended to cross over a light transmitting region of the pixels, an aperture ratio of the pixels is deteriorated.

SUMMARY OF THE INVENTION

Exemplary embodiments of the present invention provide a liquid crystal display having an increased pixel aperture ratio.

In one aspect of the present invention, a liquid crystal display includes a pixel group including a first pixel having a first thin film transistor and a second pixel having a second thin film transistor. A gate line applies a driving signal to a gate of the first and second thin film transistors. A first storage capacitor line is arranged substantially parallel with the gate line and is arranged adjacent to one side of the first pixel. A second storage capacitor line is arranged substantially parallel with the gate line and is arranged adjacent to an opposite side of the first pixel that is opposite to the one side of the first pixel. A first storage capacitor is arranged in the first pixel and connected between the first thin film transistor and the first storage capacitor line, and a second storage capacitor is arranged in the second pixel and connected between the second thin film transistor and the second storage capacitor line.

The first pixel and the second pixel are alternately arranged.

The first storage capacitor is formed in a border area between the first pixel and the second pixel that is adjacent to a right side of the first pixel, and the second storage capacitor is formed in a border area between the second pixel and the first pixel that is adjacent to a right side of the second pixel.

In an exemplary embodiment, the first storage capacitor line includes a first protruding portion and a second protruding portion. The first storage capacitor includes a first sub storage capacitor formed by a first semiconductor layer of the first thin film transistor, the first protruding portion, and an insulating material interposed between the first semiconductor layer and the first protruding portion. A second sub storage capacitor is formed by the first semiconductor layer, the second protruding portion, and an insulating material interposed between the second semiconductor layer and the second protruding portion.

The second storage capacitor line includes a third protruding portion and a fourth protruding portion. The second storage capacitor includes a third sub storage capacitor formed by a second semiconductor layer of the second thin film transistor, the third protruding portion, and an insulating material interposed between the second semiconductor layer and the third protruding portion. A fourth sub storage capacitor is formed by the second semiconductor layer, the fourth protruding portion, and an insulating material interposed between the second semiconductor layer and the fourth protruding portion.

In an exemplary embodiment, the first storage capacitor line includes a first protruding portion and a second protruding portion. The first storage capacitor includes a first sub storage capacitor formed by a first pixel electrode of the first pixel, the first protruding portion, and an insulating material interposed between the first pixel electrode and the first protruding portion. A second sub storage capacitor is formed by the first pixel electrode, the second protruding portion, and an insulating material interposed between the first pixel electrode and the second protruding portion.

The second storage capacitor line comprises a third protruding portion and a fourth protruding portion. The second storage capacitor includes a third sub storage capacitor formed by a second pixel electrode of the second pixel, the third protruding portion, and an insulating material interposed between the second pixel electrode and the third protruding portion. A fourth sub storage capacitor is formed by the second pixel electrode, the fourth protruding portion, and an insulating material interposed between the second pixel electrode and the fourth protruding portion.

The liquid crystal display further includes a driving circuit that applies a gate driving signal having a predetermined period to the gate line, applies a first signal synchronized with the gate driving signal to the first storage capacitor line, and applies a second signal having a phase opposite to the first signal to the second storage capacitor line.

In an exemplary embodiment of the present invention, a liquid crystal display includes a plurality of pixels arranged in a predetermined direction. A plurality of color filters, corresponding to the pixels, are arranged on the pixels. A plurality of light blocking parts are formed corresponding to a border area between adjacent color filters. A plurality of storage capacitors are each formed under a corresponding light blocking part. Each pixel includes a plurality of thin film transistors each of which drives a corresponding pixel. A gate line is connected to a gate of the thin film transistors and is extended along a center axis of the pixels. A first storage capacitor line is arranged in substantially parallel with the gate line and is arranged adjacent to one side of the pixels. A second storage capacitor line is arranged substantially parallel with the gate line and is arranged adjacent to an opposite side that is opposite to the one side of the pixels.

The storage capacitors includes a plurality of first storage capacitors each of which is connected between the thin film transistor of a corresponding pixel and the first storage capacitor line. A plurality of second storage capacitors are each connected between the thin film transistor of a corresponding pixel and the second storage capacitor line.

The first storage capacitors and the second storage capacitors are alternately arranged in the predetermined direction.

The liquid crystal display further includes a driving circuit that applies a gate driving signal having a predetermined period to the gate line. A first signal synchronized with the gate driving signal is applied to the first storage capacitor line. A second signal having a phase opposite to the first signal is applied to the second storage capacitor line.

The first storage capacitors and the second storage capacitors have substantially the same capacitance.

In an exemplary embodiment of the present invention, a liquid crystal display includes a plurality of pixels arranged in a predetermined direction with each pixel having a thin film transistor, a gate line providing a driving signal to a gate of the thin film transistors, and a storage capacitor line arranged in substantially parallel with the gate line. A driving circuit provides a first voltage, a second voltage, a third voltage, and a fourth voltage to the storage capacitor line. The second voltage is smaller than the first voltage, the third voltage is smaller than the second voltage, and the fourth voltage is smaller than the third voltage.

The driving circuit alternately and repeatedly applies the third voltage, the fourth voltage, the second voltage, and the first voltage in turn to the storage capacitor line.

The driving circuit applies a driving voltage to the gate line turning on the thin film transistor of each pixel when the fourth voltage or the first voltage is applied to the storage capacitor line.

The driving circuit alternately and repeatedly applies the third voltage, the first voltage, the second voltage, and the fourth voltage in turn to the storage capacitor line.

The driving circuit applies a driving voltage to the gate line turning on the thin film transistor of each pixel when the third voltage or the second voltage is applied to the storage capacitor line.

The driving circuit applies the first voltage or the fourth voltage to the storage capacitor line after the driving voltage is applied to the gate line.

In an exemplary embodiment of the present invention, a liquid crystal display includes a plurality of pixels arranged in a predetermined direction. Each pixel includes a thin film transistor, a gate line arranged in a center of the pixels providing a driving signal to a gate of the thin film transistor of each pixels, a first storage capacitor line arranged substantially parallel with the gate line and adjacent to one side of the pixels. A second storage capacitor line is arranged substantially parallel with the gate line and arranged adjacent to an opposite side that is opposite to the one side of the pixels. A first storage capacitor is arranged in a first pixel group of the pixels and is connected between the thin film transistor of a corresponding pixel of the first pixel group and the first storage capacitor line. A second storage capacitor is arranged in a second pixel group of the pixels and is connected between the thin film transistor of a corresponding pixel of the second pixel group and the second storage capacitor line. A driving circuit provides a first voltage, a second voltage, a third voltage, and a fourth voltage to the first and second storage capacitor lines. The second voltage is smaller than the first voltage, the third voltage is smaller than the second voltage, and the fourth voltage is smaller than the third voltage.

The driving circuit may further include a voltage generation circuit generating the first, second, third, and fourth voltages. A first switch group apples the first, second, third, and fourth voltages, in that order, to the first storage capacitor line. A second switch group applies the first, second, third, and fourth voltages, in that order, to the second storage capacitor line.

Each pixel arranged along the predetermined direction includes the thin film transistor. The gate line is extended along the center axis of the pixels providing the driving signal to the gate of the thin film transistors of each pixel. The first storage capacitor line is arranged along one side of the pixels, and the first storage capacitor line is extended in a direction substantially parallel with the gate line. The first storage capacitors are connected between the thin film transistor of each pixel arranged in the first pixel group and the first storage capacitor line. The second storage capacitor line is arranged along an opposite side of the pixels, and the second storage capacitor line is extended in a direction substantially parallel with the gate line. The second storage capacitors are connected between the thin film transistor of each pixel arranged in the second pixel group and the second storage capacitor line.

BRIEF DESCRIPTION OF THE DRAWINGS

The above and other features of exemplary embodiments of the present invention will be described in detail below with reference to the accompanying drawings wherein:

FIG. 15 is a cross-sectional view taken along a line of 5A-5B of FIG. 13.

DETAILED DESCRIPTION OF THE EXEMPLARY EMBODIMENTS

It will be understood that when an element or layer is referred to as being "on", "connected to" or "coupled to" another element or layer, it can be directly on, connected or coupled to the other element or layer or intervening elements or layers may be present. Hereinafter, exemplary embodiments of the present invention will be explained in detail with reference to the accompanying drawings.

Figure 1:
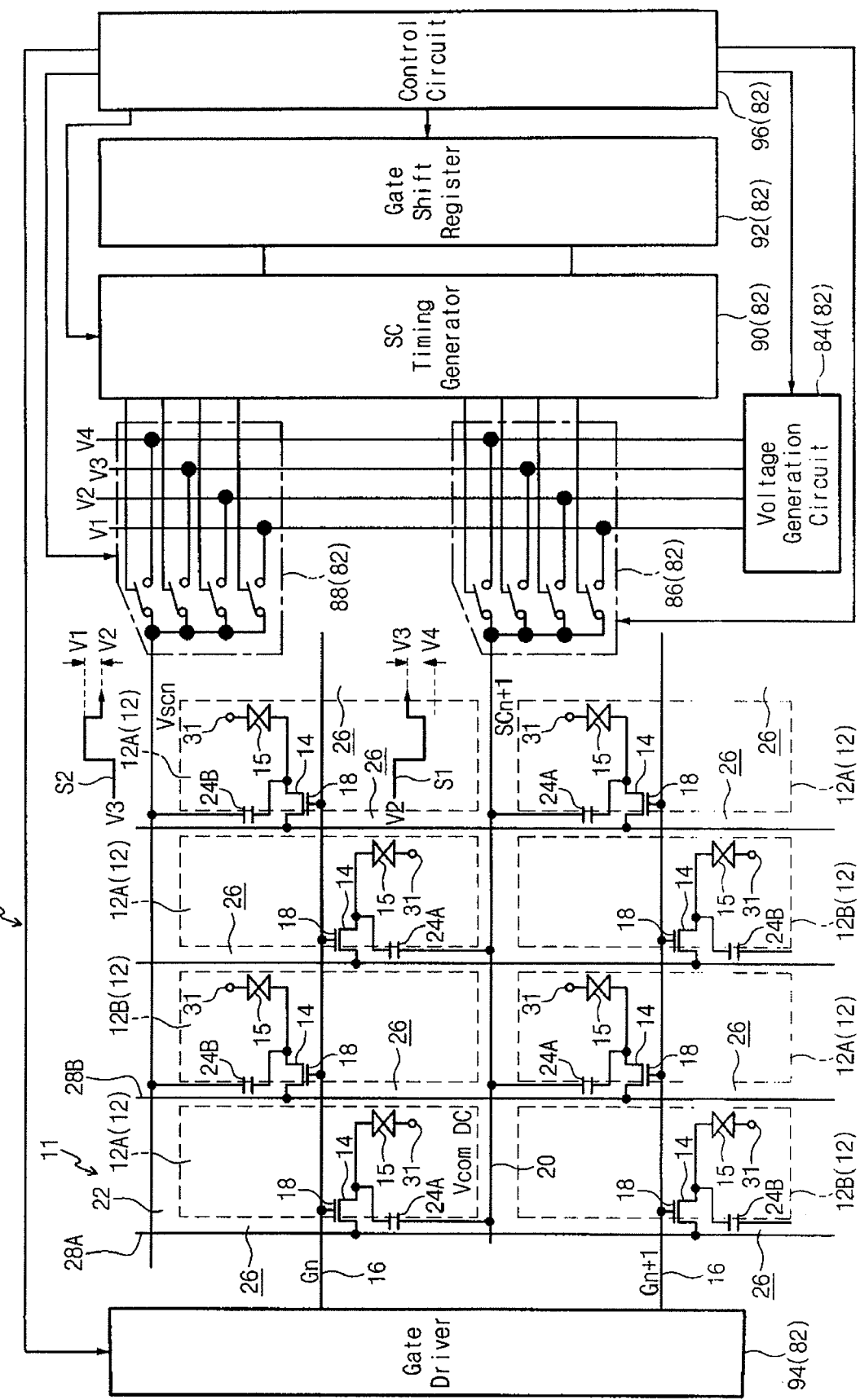
FIG. 1 is a block diagram showing an LCD according to an exemplary embodiment of the present invention.
Figure 2:
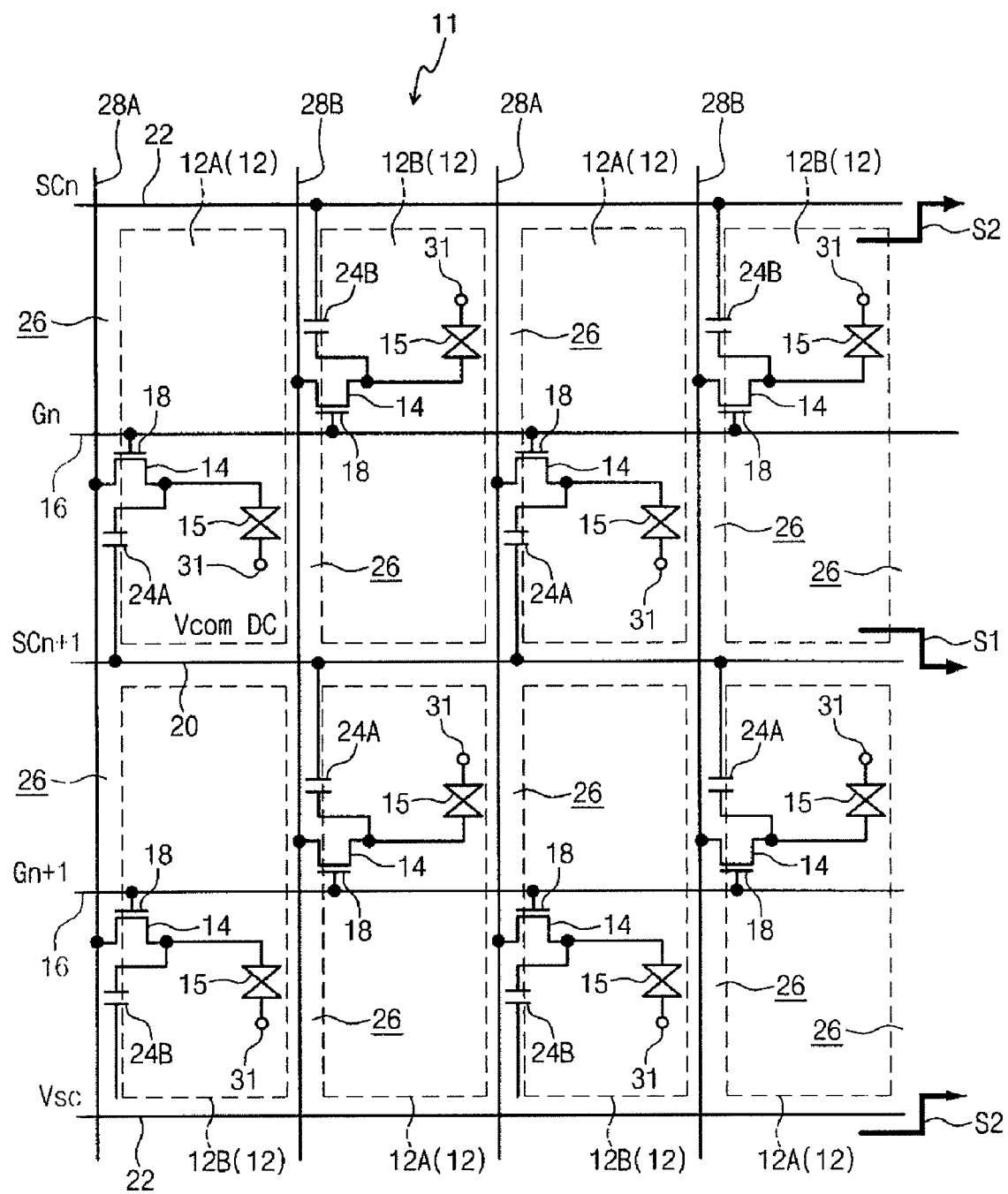
FIG. 2 is an enlarged view showing a liquid crystal display panel of the LCD of FIG. 1.
Figure 3:
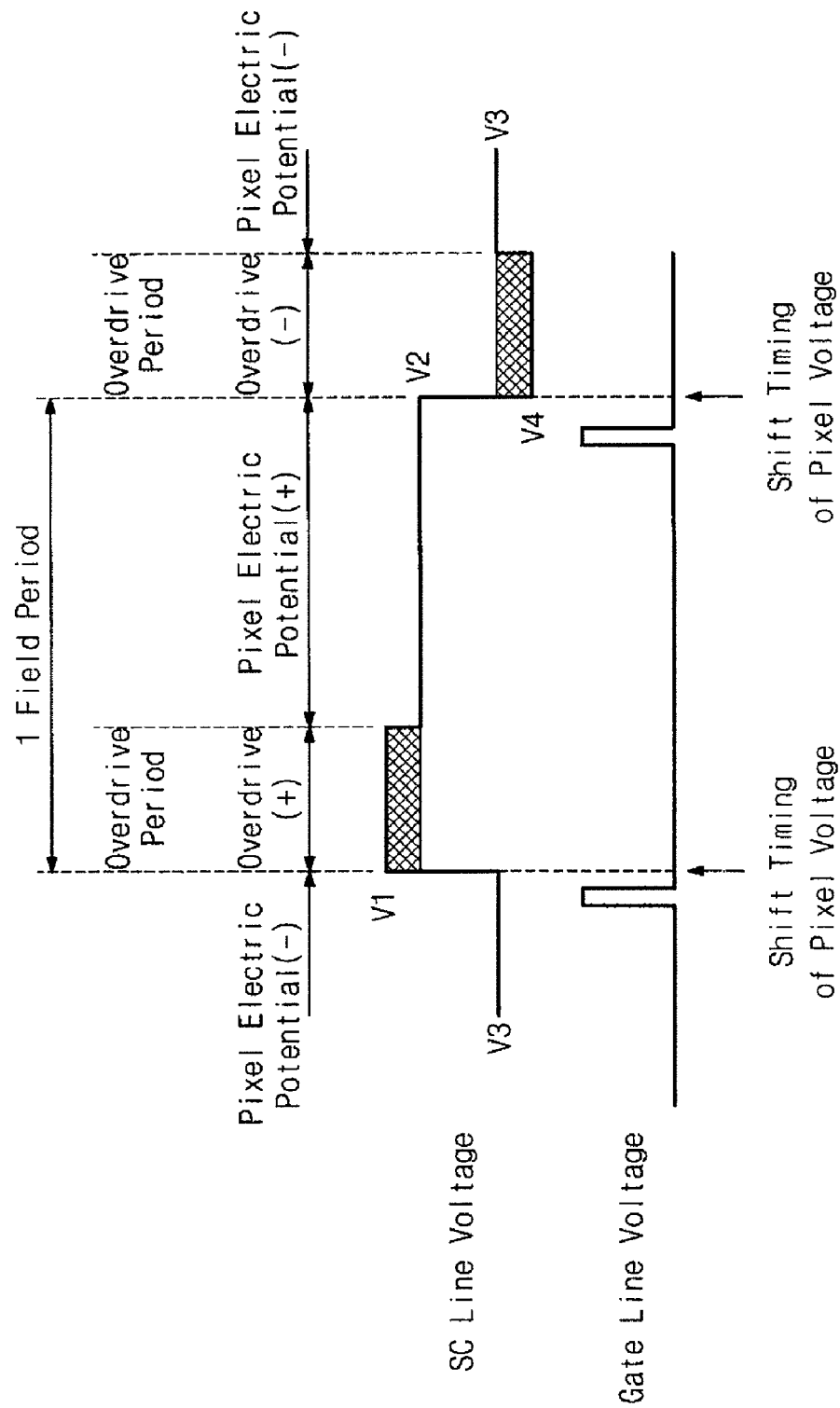
FIG. 3 is a waveforms diagram of signals illustrating an operation method of the LCD of FIG. 1.

FIG. 1 is a block diagram showing a liquid crystal display according to an exemplary embodiment of the present invention. FIG. 2 is an enlarged view showing a liquid crystal display panel of a liquid crystal display according to an exemplary embodiment of the present invention, and FIG. 3 is a waveform diagram of signals illustrating an operation method of the liquid crystal display of FIG. 1.

In FIGS. 1 and 2, a liquid crystal display (LCD) 10 is an active matrix type display device driven by a dot inversion driving method.

Referring to FIGS. 1 and 2, the LCD 10 includes a display panel 11. The display panel 11 includes a substrate (not shown), and a plurality of pixels (a pixel part) 12 formed on the substrate. Each pixel 12 is formed in a straight line shape and has a longer side in a direction of a vertical axis and a shorter side in a direction of a horizontal axis. The longer side of the pixels 12 form a column, and the pixels 12 are arranged along the column direction. The shorter side of the pixels 12 form a row, and the pixels 12 are also arranged along the row direction. Therefore, the pixels are arranged in a matrix configuration.

Each pixel 12 includes a thin film transistor 14. One end of each thin film transistor 14 is connected to one end of a liquid crystal capacitor 15 including a pixel electrode, a liquid crystal, and an opposite electrode. Also, each pixel 12 includes a pixel electrode (not shown).

The pixels 12 are divided into a first group and a second group. Hereinafter, in order to classify the pixels, the pixels 12 included in the first group will be referred to as a first pixel group 12A, and the pixels 12 included in the second group will be referred to as a second pixel group 12B. The first pixel group 12A and the second pixel group 12B are alternately arranged in both the row direction and the column direction.

A gate line 16 is arranged in a center portion of the each pixel 12. The gate line 16 is extended along the row direction and crosses over a center of each pixel 12. The gate line 16 is connected to a gate 18 of the thin film transistors 14. Accordingly, the gate line 16 applies a driving signal to the gate 18 of each thin film transistor 14 included in the pixels 12, and thus, each thin film transistor 14 drives a corresponding pixel of the pixels 12.

The display panel 11 includes a first storage capacitor line 20. The first storage capacitor line 20 is extended in a direction that is substantially parallel with the gate line 16 along the row direction of the pixels 12. Although not shown in FIGS. 1 and 2, the first storage capacitor line 20 may be angled in a zigzag shape or may have a protruding portion while extending along the row direction.

Also, the display panel 11 includes a second storage capacitor line 22. The second storage capacitor line 22 is extended in a direction that is substantially parallel with the gate line 16 along the row direction of the pixels 12. The second storage capacitor line 22 may also be angled in a zigzag shape or may also have a protruding portion while extending along the row direction.

A storage capacitor line that is thicker than a gate line is arranged in a light blocking part between the pixels and a storage capacitor is able to maintain an electric potential of a pixel. A storage capacitor is formed in a light blocking part that is blocked by a signal line between the pixels. Therefore, a size of a storage capacitor formed in the light transmitting region may be reduced, thereby increasing the aperture ratio of the pixels 12.

A plurality of first storage capacitors 24A is arranged in each pixel of the first pixel group 12A among the pixels 12. Each of the first storage capacitors 24A is connected between a corresponding thin film transistor 14 in the first pixel group 12A and the first storage capacitor line 20.

A plurality of second storage capacitors 24B is arranged in each pixel of the second pixel group 12B among the pixels 12. Each of the second storage capacitors 24B is connected between a corresponding thin film transistor 14 in the second pixel group 12B and the second storage capacitor line 22. The first and second storage capacitors 24A and 24B form the storage capacitors 24.

The first storage capacitors 24A and the second storage capacitors 24B are alternately arranged along both the row direction and the column direction of the pixels 12. The first storage capacitors 24A and the second storage capacitors 24B have substantially the same capacitance.

A first signal line 28A is connected to the thin film transistor 14 of the first pixel group 12A and provides an image signal to the thin film transistor 14 of the first pixel group 12A. A second signal line 28B is connected to the thin film transistor 14 of the second pixel group 12B provides the image signal to the thin film transistor 14 of the second pixel group 12B.

Figure 4:
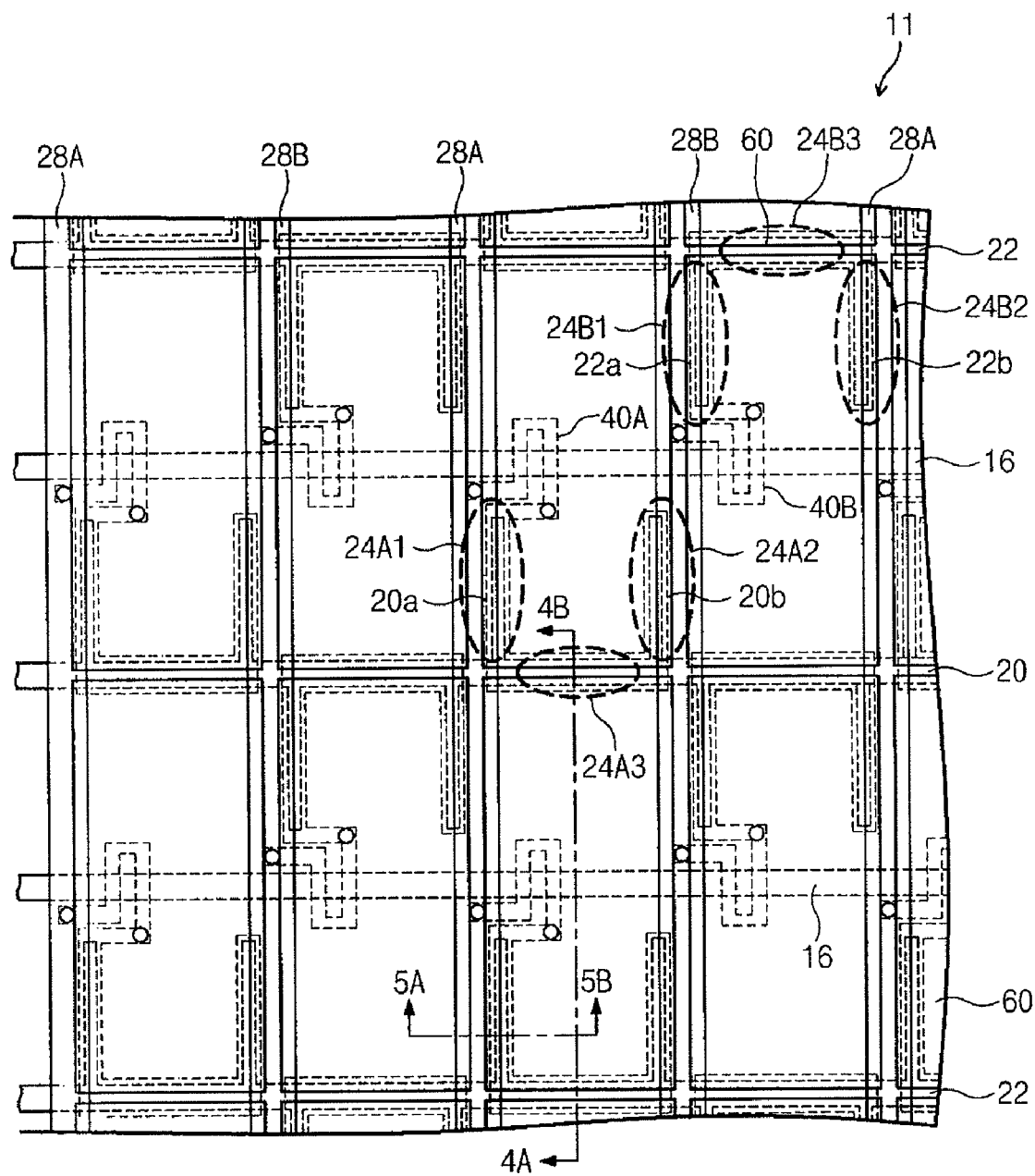
FIG. 4 is a layout showing a pixel part of the LCD of FIG. 1.
Figure 5:
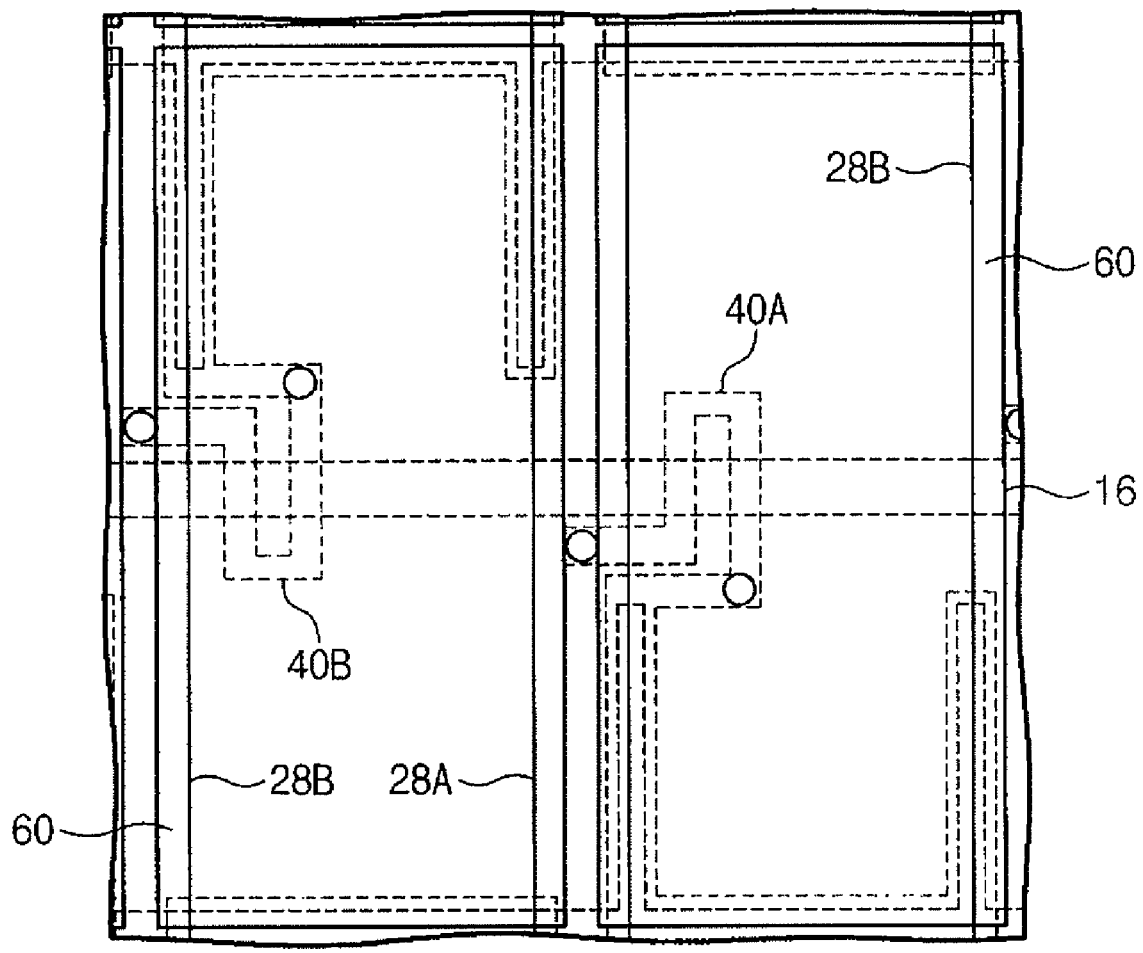
FIG. 5 is a partially enlarged view showing a pixel part of the LCD of FIG. 4.
Figure 6:
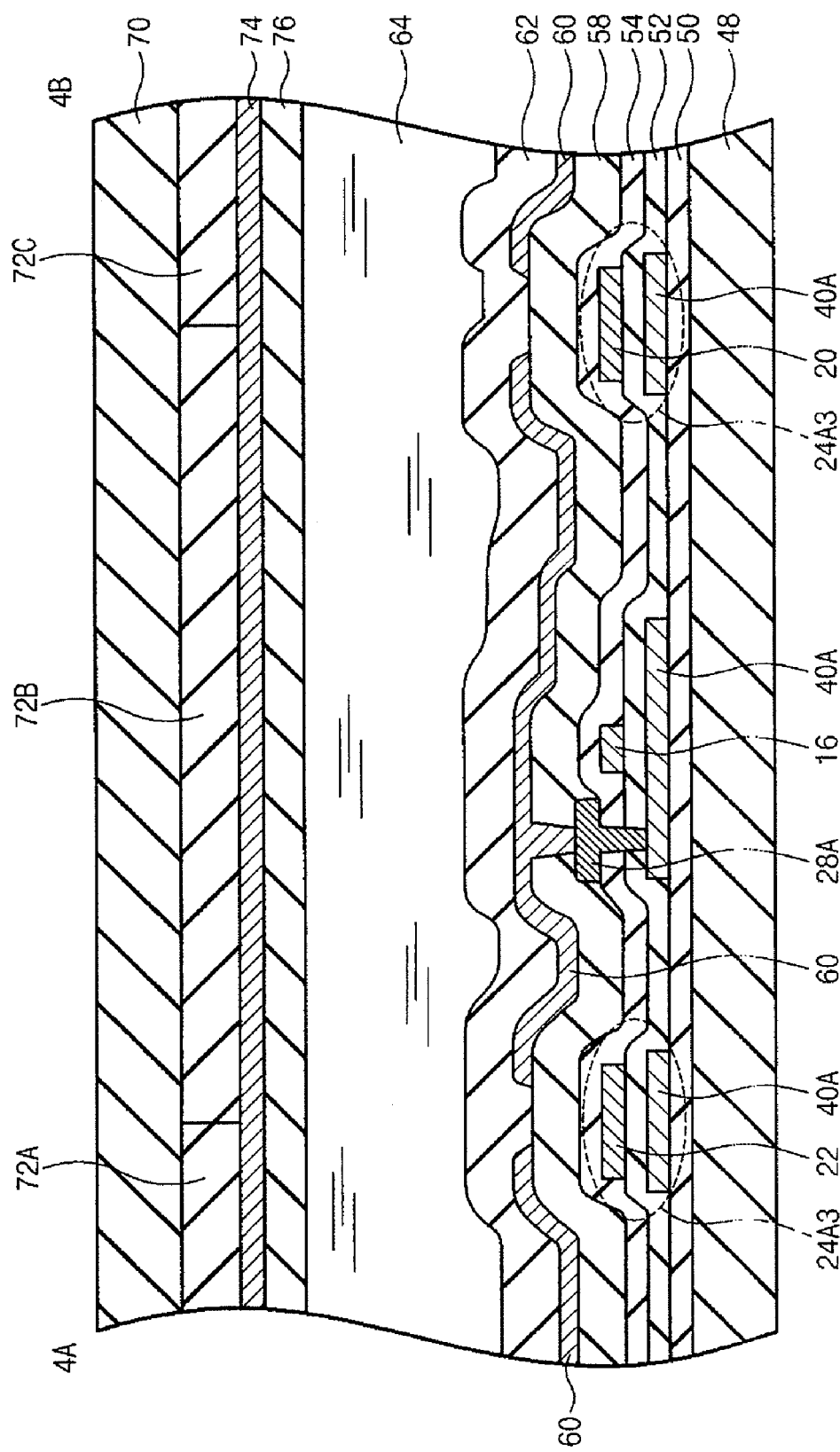
FIG. 6 is a cross-sectional view taken along a line 4A-4B of FIG. 4.
Figure 7:
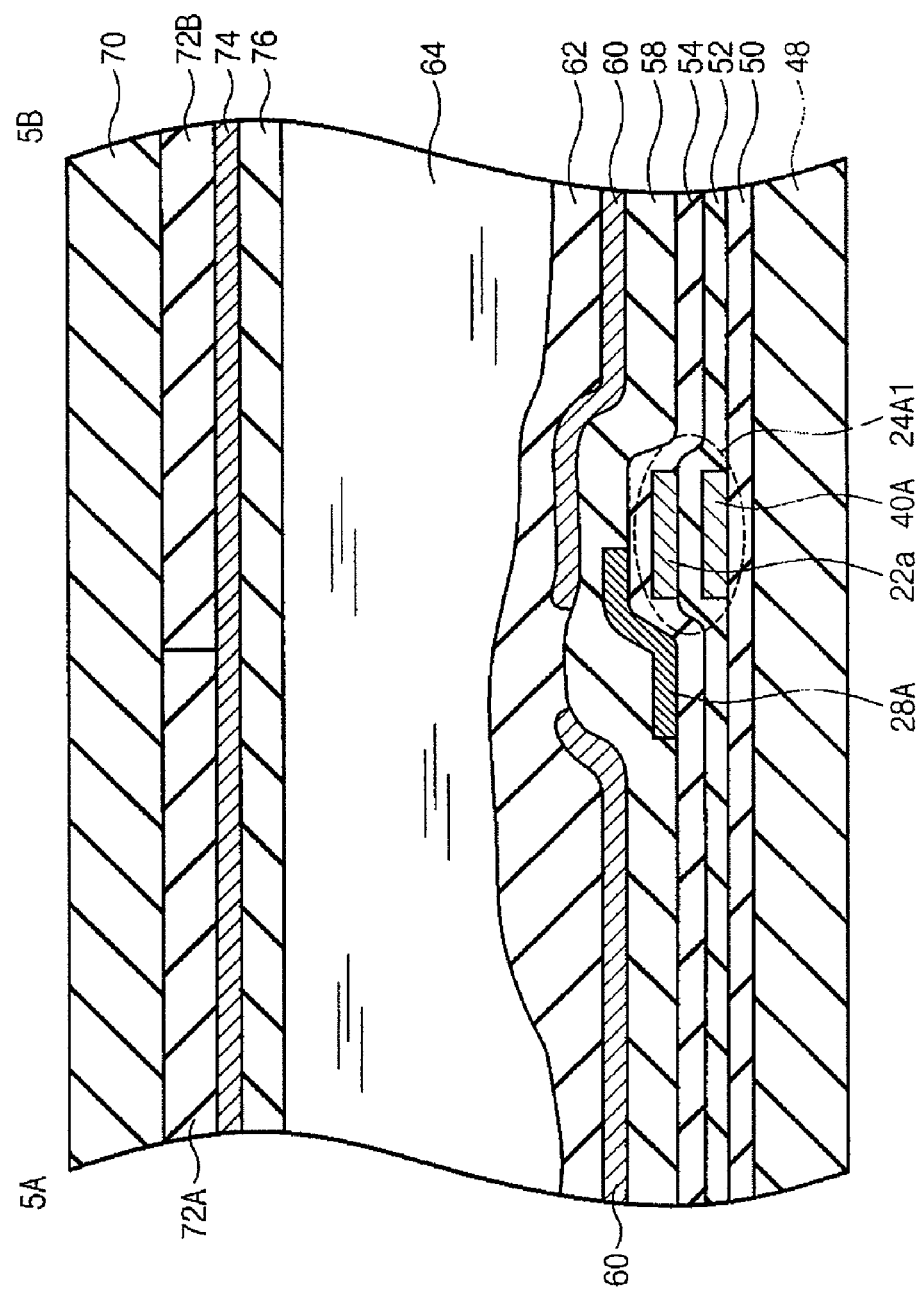
FIG. 7 is a cross-sectional view taken along a line 5A-5B of FIG. 4.

FIG. 4 is a layout showing a pixel part of a liquid crystal display of FIG. 1 according to an exemplary embodiment of the present invention. FIG. 5 is a partially enlarged view showing a pixel part of the liquid crystal display of FIG. 4. FIG. 6 is a cross-sectional view taken along a line 4A-4B of FIG. 4, and FIG. 7 is a cross-sectional view taken along a line 5A-5B of FIG. 4.

In the exemplary embodiment, the first storage capacitor 24A is formed in a border area 26 between the first pixel group 12A and the second pixel group 12B that is adjacent to the first pixel group 12A, and the second storage capacitor 24B is formed in a border area 26 between the second pixel group 12B and the first pixel group 12A that is adjacent to the second pixel group 12B.

As shown in FIGS. 4 and 5, the first pixel group 12A of the LCD includes a first semiconductor layer 40A of the thin film transistor 14. The first semiconductor layer 40A is formed in a zigzag shape. As shown in FIG. 4, the first semiconductor layer 40A is formed under a first protruding portion 20a, a second protruding portion 20b, and portion of the first storage capacitor line 20. Since portion of the first signal line 28A, the first protruding portion 20a, and portion of the first semiconductor layer 40A are overlapped with each other, a light blocking layer is not required on the overlapped area. Also, a first sub storage capacitor 24A1 is formed by the first semiconductor layer 40A, the first protruding portion 20a, and an insulating layer (not shown) interposed between the first semiconductor layer 40A and the first protruding portion 20a, and a second sub storage capacitor 24A2 is formed by the first semiconductor layer 40A, the second protruding portion 20b, and an insulating layer interposed between the first semiconductor layer 40A and the second protruding portion 20b. Since portion of the second signal line 28B, the second protruding portion 20b, and portion of the first semiconductor layer 40A are overlapped with each other, a light blocking layer is not required on the overlapped area. A third sub storage capacitor 24A3 is formed by the first semiconductor layer 40A, portion of the first storage capacitor line 20, and an insulating layer interposed between the first semiconductor layer 40A and the portion of first storage capacitor line 20. In the exemplary embodiment, the first storage capacitor 24A of the first pixel group 12A is formed by the first to third sub storage capacitors 24A1, 24A2, and 24A3.

Also, in FIG. 4, a reference numeral 60 represents a pixel electrode. In the exemplary embodiment, the pixel electrode 60 may include indium zinc oxide (IZO) or indium tin oxide (ITO). As shown in FIGS. 4 and 5, the second pixel group 12B of the LCD includes a second semiconductor layer 40B of the thin film transistor 14. In the exemplary embodiment, the second semiconductor layer 40B is formed in a zigzag shape. As shown in FIG. 4, the second semiconductor layer 40B is formed under a third protruding portion 22a, a fourth protruding portion 22b, and portion of the second storage capacitor line 22. Since portion of the second signal line 28B, the third protruding portion 22a, and portion of the second semiconductor layer 40B are overlapped with each other, a light blocking layer is not required on the overlapped area. A fourth sub storage capacitor 24B1 is formed by the second semiconductor layer 40B, the third protruding portion 22a, and an insulating layer interposed between the second semiconductor layer 40B and the third protruding portion 22a. Also, a fifth sub storage capacitor 24B2 is formed by the second semiconductor layer 40B, the fourth protruding portion 22b, and an insulating layer interposed between the second semiconductor layer 40B and the fourth protruding portion 22b. Since portion of the first signal line 28A, the fourth protruding portion 22b, and portion of the second semiconductor layer 40B are overlapped with each other, a light blocking layer is not required on the overlapped area. A sixth sub storage capacitor 24B3 is formed by the second semiconductor layer 40B, portion of the second storage capacitor line 22, and an insulating layer interposed between the second semiconductor layer 40B and the portion of the second storage capacitor line 22. In the exemplary embodiment, the second storage capacitor 24B of the second pixel group 12B is formed by the fourth to sixth sub storage capacitors 24B1, 24B2, and 24B3.

The first and second storage capacitors 24A and 24B include a non-transparent metal layer, so that the first and second storage capacitors 24A and 24B may serve as a light blocking part in each pixel.

As shown in FIGS. 4 and 5, since the protruding portions are formed at each of the first and second storage capacitor lines 20 and 22 in the LCD according to the exemplary embodiment of the present invention, the first and second storage capacitors 24A and 24B having a sufficient capacitance may be formed in the first and second pixel groups 12A and 12B. As described above, the first and second semiconductor layers 40A and 40B include poly-silicon and are formed in a zigzag shape, however, materials and shapes of the first and second semiconductor layers may be embodied in many different ways and should not be construed as limited to including poly-silicon and having the zigzag shape.

Referring to FIGS. 6 and 7, a thin film transistor substrate of the LCD includes a first substrate 48, a first protective layer 50, the first semiconductor layer 40A, the gate line (gate electrode) 16, a gate insulating layer 52, an inter-insulating layer 54, the signal line 28, a second protective layer 58, the pixel electrode 60, and a first alignment layer 62. Also, an opposite substrate of the LCD includes a second substrate 70, color filters 72A, 72B, and 72C, an opposite electrode 74, and a second alignment layer 76. The thin film transistor substrate and the opposite substrate are connected with each other with a spacer (not shown) interposed therebetween, and a liquid crystal layer 64 is interposed between the thin film transistor substrate and the opposite substrate. Although not shown in FIGS. 6 and 7, the opposite substrate may further include a light blocking layer (not shown) arranged corresponding to a border area between adjacent color filters 72A, 72B, and 72C.

In the exemplary embodiment, the first protective layer 50 includes a silicon nitride layer, the gate line (gate electrode) 16 includes molybdenum-tantalum (MoTa), and the gate insulating layer 52 includes a silicon oxide layer. Also, the gate insulating layer 52 includes a two-layered structure of the silicon oxide layer and the silicon nitride layer, the signal line 28 includes aluminum (Al), and the second protective layer 58 includes a silicon oxide layer (SiO2). The pixel electrode 60 includes indium tin oxide ITO and the first alignment layer 62 includes polyimide. However, materials of the above mentioned elements are not limited to those materials listed herein.

Referring to FIG. 1, the LCD 10 includes a driving circuit 82. The driving circuit 82 includes a voltage generation circuit 84, a first switch group 86, a second switch group 88, a SC timing generator 90, a gate shift register 92, a gate driver 94, and a control circuit 96.

The voltage generation circuit 84 generates a first voltage V1, a second voltage V2, a third voltage V3, and a fourth voltage V4. The first switch group 86 selects the first to fourth voltages V1, V2, V3, and V4 to apply the voltages in an order of the first, second, third, and fourth voltages V1, V2, V3, and V4 to the first storage capacitor line 20. The second switch group 88 selects the first to fourth voltages V1, V2, V3, and V4 to apply the voltages in an order of the first, second, third, and fourth voltages V1, V2, V3 and V4 to the second storage capacitor line 22. The SC timing generator 90 is connected to the first switch group 86 and the second switch group 88. The SC timing generator 90 controls switching operation timings of the first switch group 86 and the second switch group 88.

The SC timing generator 90 is connected to the gate shift register 82. The gate shift register 82 outputs a command signal with respect to the gate line 16 selected by the SC timing generator 90 to the SC timing generator 90.

Also, the gate driver 94 is connected to the gate line 16. The gate driver 94 provides a gate driving signal to the gate line 16 to drive the pixels 12 connected to the selected gate line 16.

As described above, the voltage generation circuit 84, the first switch group 86, the second switch group 88, the SC timing generator 90, the gate shift register 92, and the gate driver 94 are connected to the control circuit 96, and the control circuit 96 controls operations of the voltage generation circuit 84, the first switch group 86, the second switch group 88, the SC timing generator 90, the gate shift register 82, and the gate driver 84.

Whole or parts of the voltage generation circuit 84, the first switch group 86, the second switch group 88, the SC timing generator 90, the gate shift register 92, the gate driver 94, and the control circuit 96 may be integrally formed with the display panel 11 or may be formed in an IC chip.

The driving circuit 82 provides a gate driving signal having a predetermined period to the gate line 16, provides a first signal SI that is synchronized with the gate driving signal to the first storage capacitor line 20, and provides a second signal S2 having a phase opposite to the first signal S1 to the second storage capacitor line 22. More particularly, the second signal S2 has a timing that is behind the first signal S1 by one horizontal period. The driving circuit 82 applies the first to fourth voltages V1, V2, V3, and V4 to the first and second storage capacitor lines 20 and 22. In this case, the second voltage V2 is smaller than the first voltage V1, the third voltage V3 is smaller than the second voltage V2 and the fourth voltage V4 is smaller than the third voltage V3.

As shown in FIG. 3, the driving circuit 82 alternately and repeatedly applies the first to fourth voltages V1 through V4 in an order of the third voltage V3, the first voltage V1, the second voltage V2, and the fourth voltage V4 to both the first and second storage capacitor lines 20 and 22.

The driving circuit 82 is set to over-drive the voltage applied to the first and second storage capacitor lines 20 and 22 right after the gate 18 of the thin film transistor 14 is turned on, for example, at a shift timing of a pixel voltage of the pixels 12.

Where an electric potential of the pixels 12 is transited from a negative electric potential (−) to a positive electric potential (+), the driving circuit 82 applies the driving voltage (the gate driving signal) to the gate line 16 and turns on the gate 18 of the thin film transistor 14 of a corresponding pixel 12 when the third voltage V3 is applied to the first storage capacitor line 20 or the second storage capacitor line 22. Thus, the pixels 12 may enter an overdrive period right after the thin film transistor 14 is turned on. The driving circuit 82 applies the first voltage V1 that is higher than the second voltage V2 to the first and second storage capacitor lines 20 and 22 during the overdrive period. Accordingly, when compared to a configuration that applies the second voltage V2 after the third voltage V3 to the first and second storage capacitor lines 20 and 22, a relatively-higher voltage (V1-V3) may be applied to the first and second storage capacitor lines 20 and 22.

Also, in case that an electric potential of the pixels 12 is transitioned from a positive electric potential (+) to a negative electric potential (−), the driving circuit 82 applies the driving voltage (the gate driving signal) to the gate line 16 to turn on the gate 18 of the thin film transistor 14 of a corresponding pixel 12 when the second voltage V2 is applied to the first storage capacitor line 20 or the second storage capacitor line 22. Thus, the pixels 12 may enter the overdrive period right after the thin film transistor 14 is turned on. The driving circuit 82 applies the fourth voltage V4 that is lower than the third voltage V3 to the first and second storage capacitor lines 20 and 22 during the overdrive period. Accordingly, when compared to a configuration that applies the third voltage V3 after the second voltage V2 to the first and second capacitor lines 20 and 22, a relatively-higher voltage (V4-V2) may be applied to the first and second storage capacitor lines 22.

As described above, since a voltage that is higher than that of a conventional configuration may be applied to the storage capacitor 24 when a voltage is applied to a liquid crystal capacitor 15, an alignment state of a liquid crystal may be controlled more quickly than the conventional configuration, and further the pixel voltage of the pixels 12 may be maintained at an appropriate level longer than that of the conventional configuration.

An LCD according to an exemplary embodiment of the present invention will be described below. As with the LCD 10 described above, the LCD according to the exemplary embodiment of the present invention is an active matrix type display device and is driven by a dot inversion driving method. Also, the LCD 10 according to the exemplary embodiment has the same configurations and functions as those of the LCD described above except for a configuration of a pixel. Therefore, the detailed descriptions of elements that are the same as discussed above may be omitted.

Figure 8:
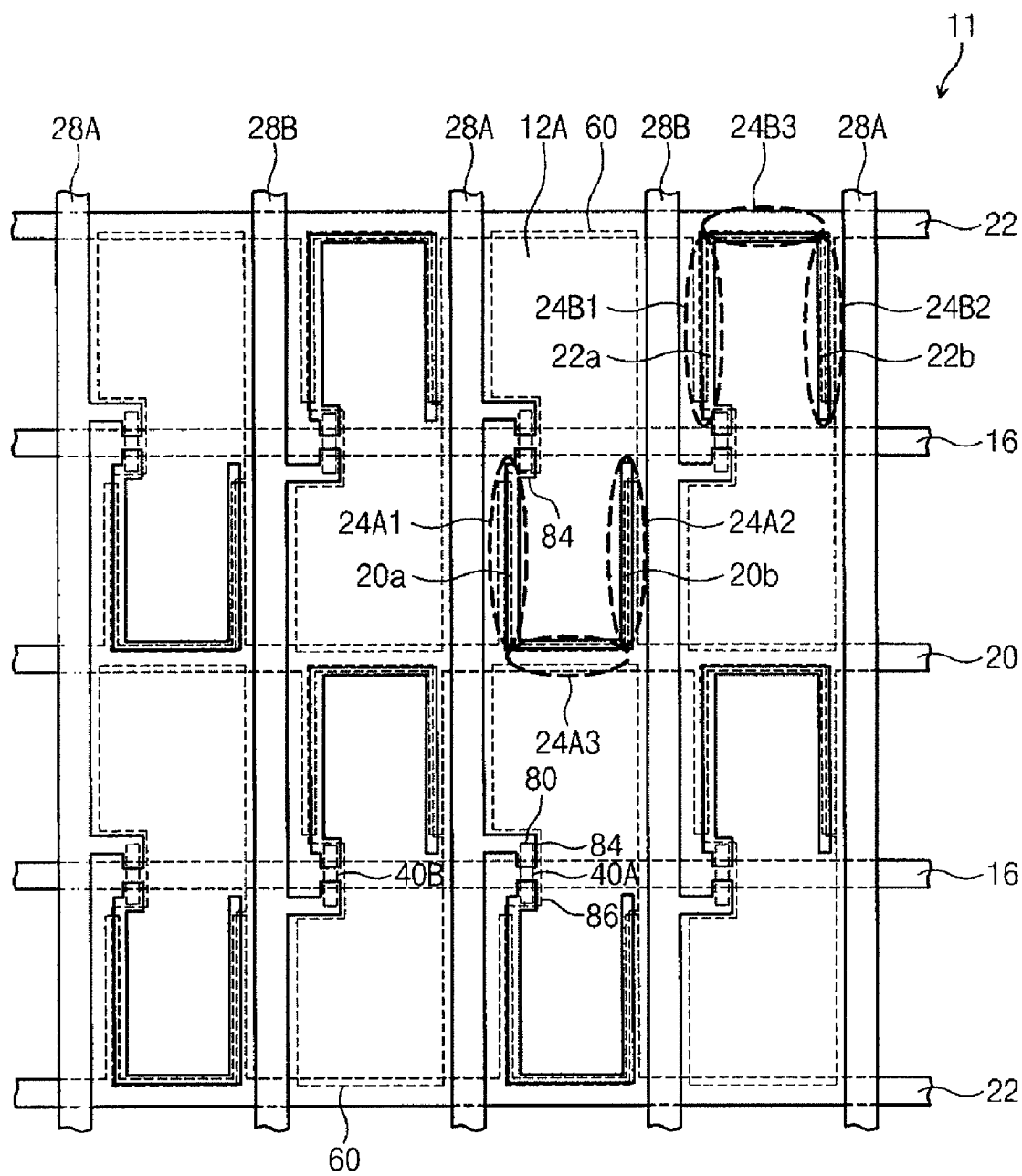
FIG. 8 is a layout showing a pixel part of an LCD according to an exemplary embodiment of the present invention.
Figure 9:
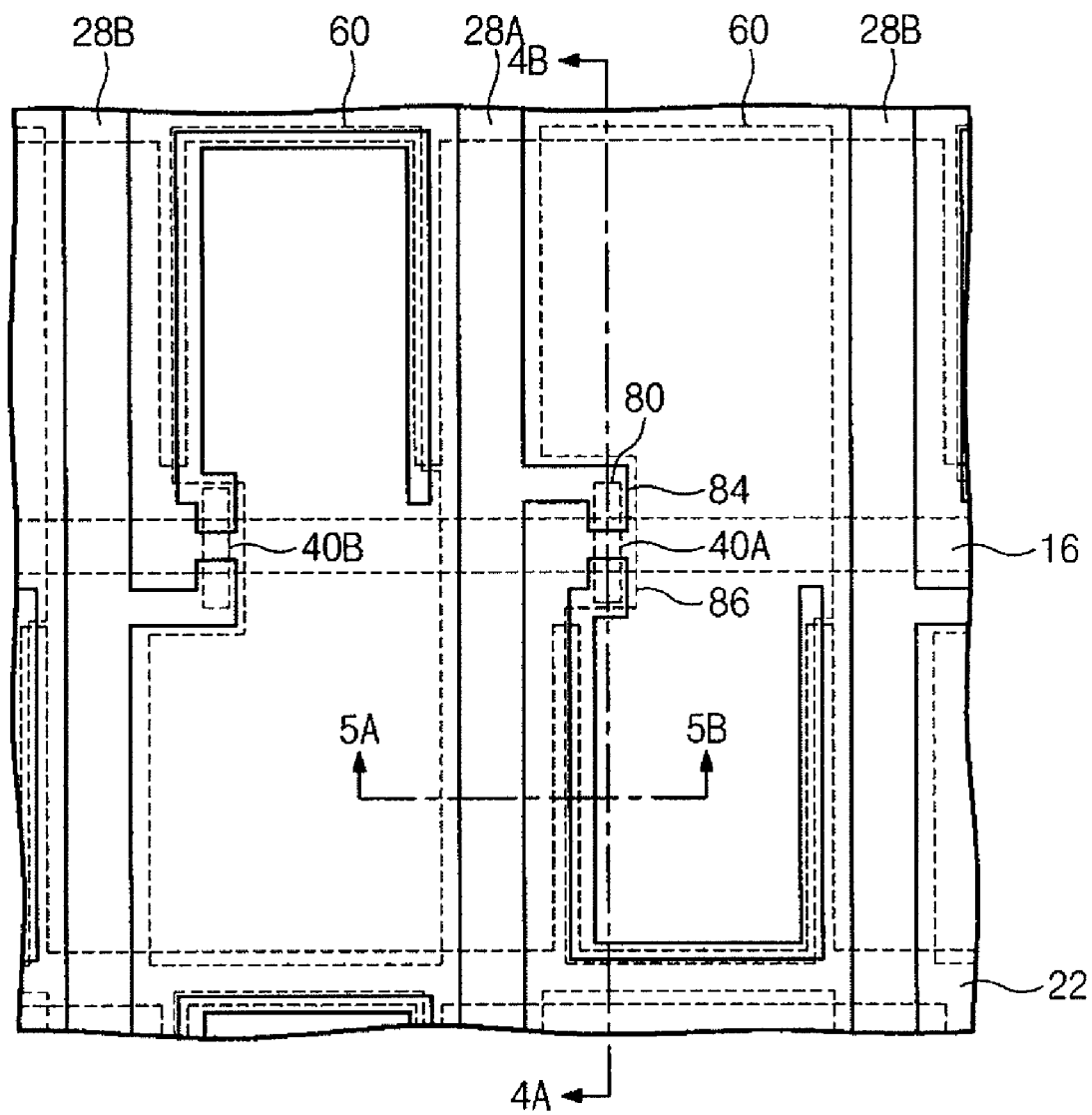
FIG. 9 is a partially enlarged view showing a pixel part of the LCD of FIG. 8.
Figure 10:
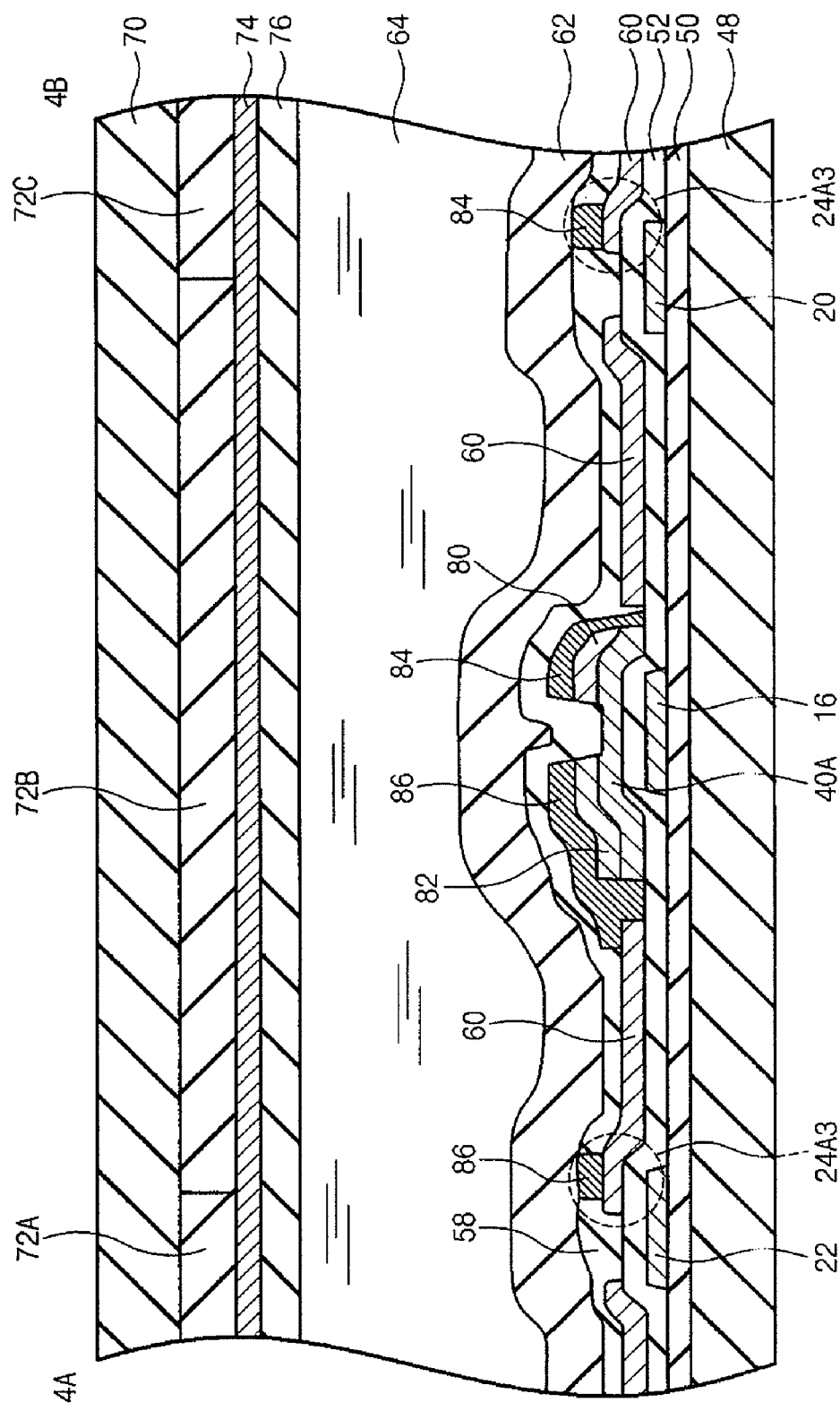
FIG. 10 is a cross-sectional view taken along a line 4A-4B of FIG. 9.
Figure 11:
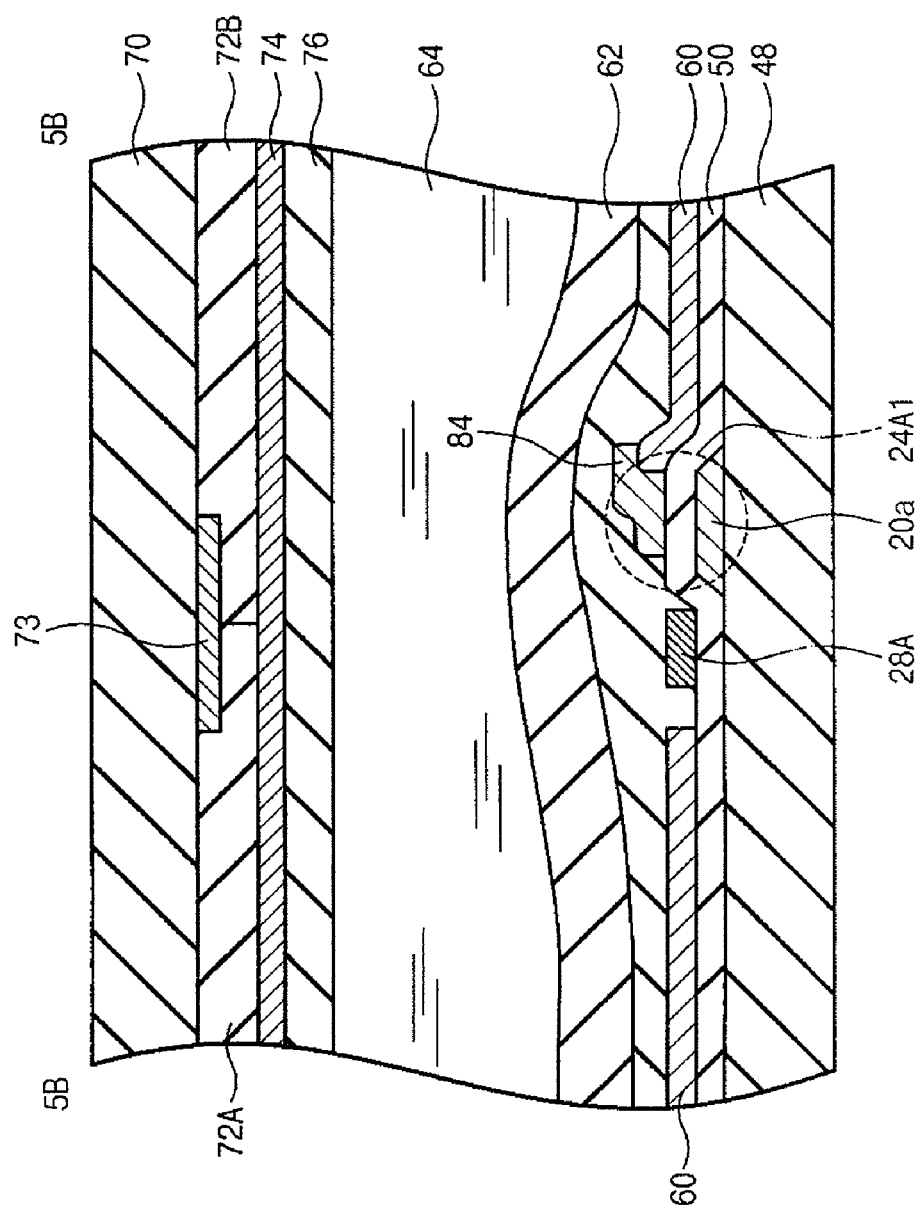
FIG. 11 is a cross-sectional view taken along a line of 5A-5B of FIG. 9.

FIG. 8 is a layout showing an exemplary embodiment of a pixel part of an LCD according to an exemplary embodiment of the present invention. FIG. 9 is a partially enlarged view showing a pixel part of the LCD of FIG. 8. FIG. 10 is a cross-sectional view taken along a line 4A-4B of FIG. 9, and FIG. 11 is a cross-sectional view taken along a line of 5A-5B of FIG. 9.

In the exemplary embodiment, a first storage capacitor 24A is formed along a border area 26 between a first pixel group 12A and a second pixel group 12B that is adjacent to the first pixel group 12A. Meanwhile, a second storage capacitor 24B is formed along a border area 26 between the second pixel group 12B and a first pixel group 12A that is adjacent to the second pixel group 12B.

As shown in FIGS. 8 and 9, the LCD 10 includes a first semiconductor layer 40A of a thin film transistor 14 arranged in the first pixel group 12A. The first semiconductor layer 40A is angled in a substantially right-angle shape. However, the shape of the first semiconductor layer 40A is not limited to the right-angle shape as shown in FIG. 8. In FIG. 8, a first storage capacitor line 20 includes a first protruding portion 20a and a second protruding portion 20b. The reference numeral 60 represents a pixel electrode. In the exemplary embodiment, the pixel electrode 60 may include indium zinc oxide (IZO) or indium tin oxide (ITO). In the LCD 10 according to the exemplary embodiment, a first sub storage capacitor 24A1 is formed by an electrode 84 that is formed on the first semiconductor layer 40A and electrically connected to the pixel electrode 60, the first protruding portion 20a, and an insulating layer (not shown) interposed between the electrode 84 and the first protruding portion 20a. Also, a second sub storage capacitor 24A2 is formed by the pixel electrode 60, the second protruding portion 20b, and an insulating layer interposed between the pixel electrode 60 and the second protruding portion 20b. A third sub storage capacitor 24A3 is formed by the pixel electrode 60, portion of the first storage capacitor line 20, and an insulating layer interposed between the pixel electrode 60 and the portion of the first storage capacitor line 20. The first storage capacitor 24A of the first pixel group 12A is formed by the first to third sub storage capacitors 24A1, 24A2, and 24A3.

Also, as shown in FIG. 8, the LCD 10 includes a second semiconductor layer 40B of a thin film transistor 14 arranged in the second pixel group 12B. In the present exemplary embodiment, the second semiconductor layer 40B is angled in a substantially right-angle shape. However, the shape of the second semiconductor layer 40B is not limited to the right-angle shape as shown in FIG. 8. In FIG. 8, a second storage capacitor line 22 includes a third protruding portion 22a and a fourth protruding portion 22b. In the LCD 10, a fourth sub storage capacitor 24B1 is formed by an electrode 84 that is formed on the second semiconductor layer 40B and electrically connected to the pixel electrode 60, the third protruding portion 22a, and an insulating layer (not shown) interposed between the electrode 84 and the third protruding portion 22a. Also, a fifth sub storage capacitor 24B2 is formed by the pixel electrode 60, the fourth protruding portion 22b, and an insulating layer interposed between the pixel electrode 60 and the fourth protruding portion 22b. A sixth sub storage capacitor 24B3 is formed by the pixel electrode 60, portion of the second storage capacitor line 22, and an insulating layer interposed between the pixel electrode 60 and the portion of the second storage capacitor line 22. Thus, the second storage capacitor 24B of the second pixel group 12B is formed by the fourth to sixth sub storage capacitors 24B1, 24B2, and 24B3.

Since the first and second storage capacitors 24A and 24B include a non-transparent metal layer, the first and second storage capacitors 24A and 24B may serve as a light blocking part in each pixel.

As shown in FIG. 8, in the LCD 10 according to the exemplary embodiment, each of the first and second storage capacitors 24A and 24B includes three sub storage capacitors, and thus the first and second storage capacitors 24A and 24B may provide a sufficient capacitance. In the exemplary embodiment, the first and second semiconductor layers 40A and 40B include amorphous silicon and are formed in a substantially right-angle shape, however, materials and shapes of the first and second semiconductor layers 40A and 40B may be embodied in many different ways and should not be limited to the amorphous silicon and the right-angle shape described herein.

As shown in FIGS. 10 and 11, a thin film transistor substrate of the LCD according to the exemplary embodiment includes a first substrate 48, a first protective layer 50, the first semiconductor layer 40A, a gate insulating layer 52, a gate line (a gate electrode) 16, ohmic contact layers 80 and 82, a source electrode 84, a drain electrode 86, a second protective layer 58, the pixel electrode 60, and a first alignment layer 62. Also, an opposite substrate of the LCD includes a second substrate 70, color filters 72A, 72B, and 72C, an opposite electrode 74, and a second alignment layer 76. The thin film transistor substrate and the opposite substrate are connected with each other with a spacer interposed therebetween, and a liquid crystal layer 64 is interposed between the thin film transistor substrate and the opposite substrate. Also, a light blocking part 73 is further arranged in the second substrate 70.

In the exemplary embodiment, the first protective layer 50 includes a silicon nitride layer, the gate line (gate electrode) 16 includes molybdenum tantalum (MoTa), and the gate insulating layer 52 includes a silicon oxide layer. Also, the signal line 28 includes aluminum (Al), the second protective layer 58 includes a silicon nitride layer (SiN), the pixel electrode 60 includes ITO, and the first alignment layer 62 includes polyimide. However, materials of the above-mentioned elements should not be limited to those materials described herein.

An LCD 10 according to an exemplary embodiment of the present invention will be described below. As in the exemplary embodiments described above, the LCD 10 according to the exemplary embodiment is an active matrix type display device and is driven by a dot inversion driving method. Also, the LCD according to the exemplary embodiment has the same configurations and functions as those of the LCDs described above except for a configuration of a pixel part. Therefore, the detailed description of elements that are the same as discussed above may be omitted.

Figure 12:
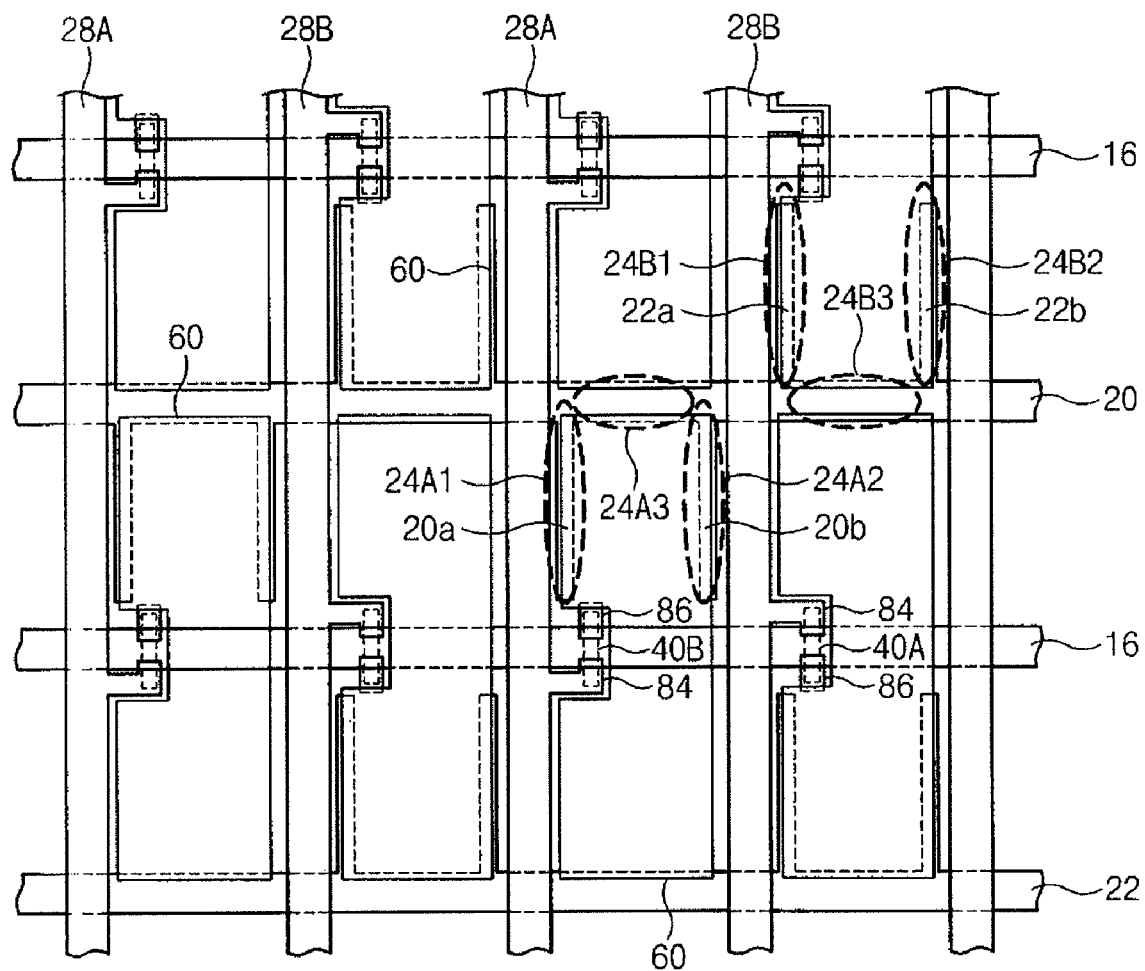
FIG. 12 is a layout showing a pixel part of an LCD according to an exemplary embodiment of the present invention.
Figure 13:
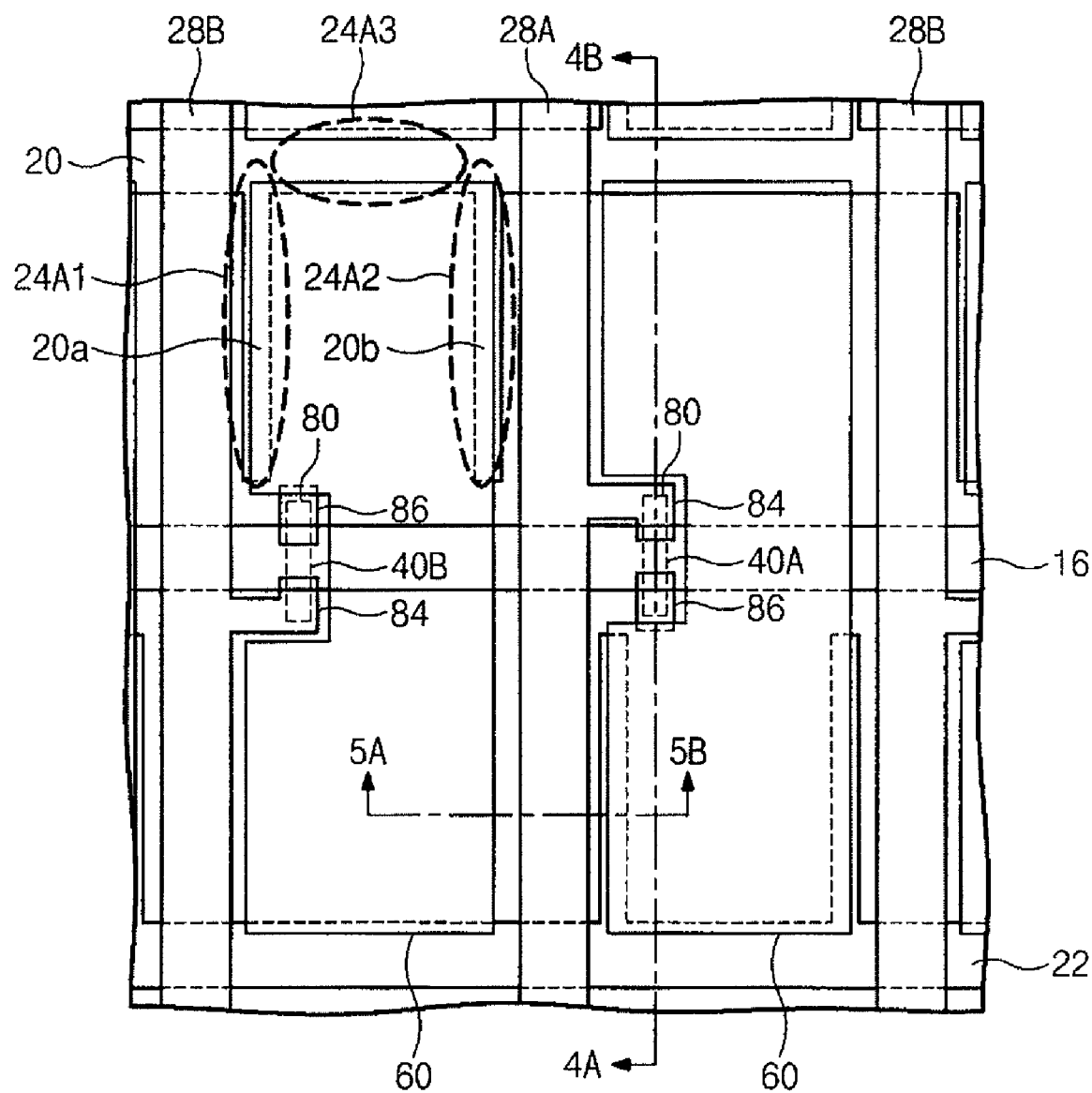
FIG. 13 is a partially enlarged view showing a pixel part of the LCD of FIG. 12.
Figure 14:
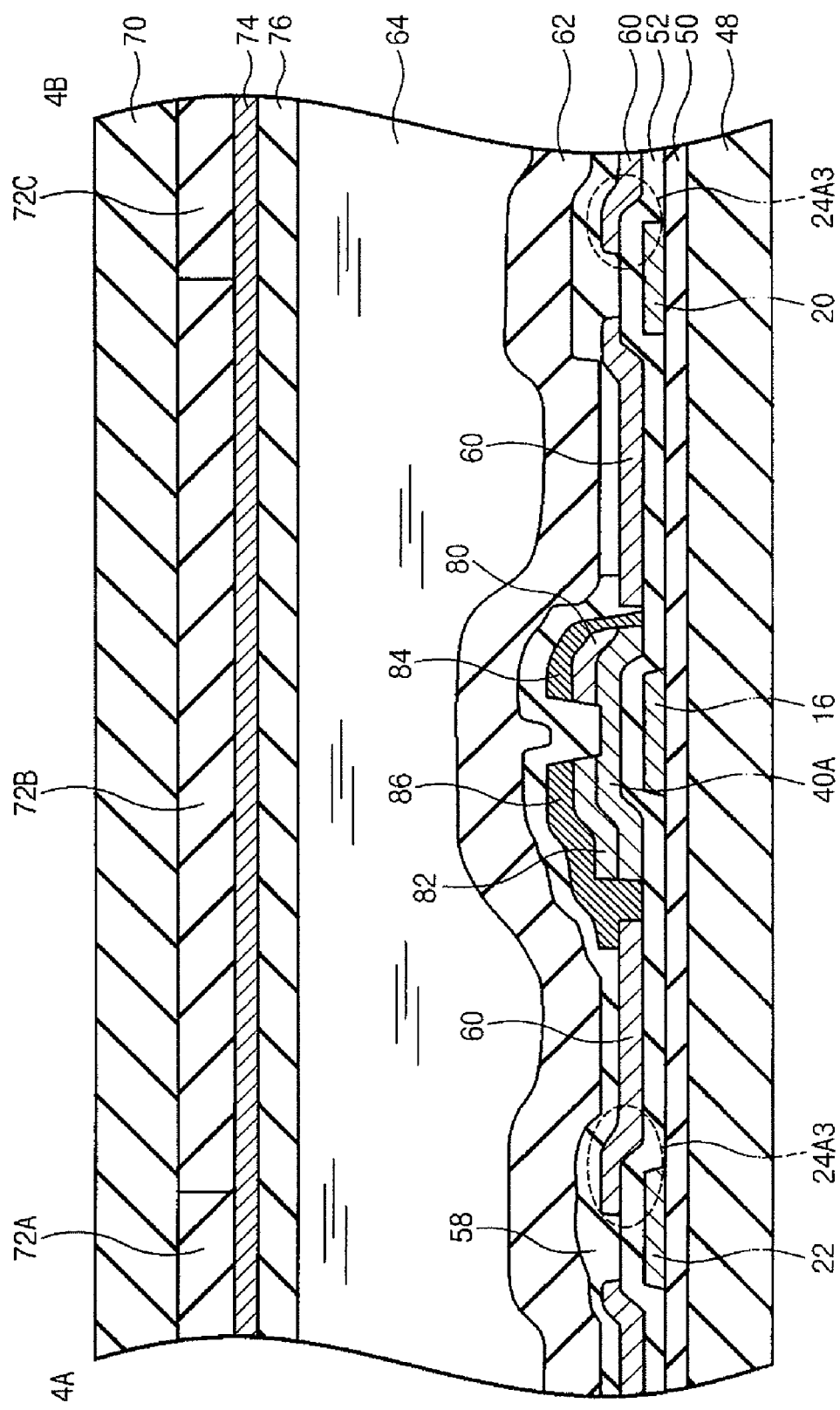
FIG. 14 is a cross-sectional view taken along a line 4A-4B of FIG. 13.

FIG. 12 is a layout showing a pixel part of an LCD according to an exemplary embodiment of the present invention. FIG. 13 is a partially enlarged view showing a pixel part of the LCD of FIG. 12. FIG. 14 is a cross-sectional view taken along a line 4A-4B of FIG. 13, and FIG. 15 is a cross-sectional view taken along a line of 5A-5B of FIG. 13.

In the exemplary embodiment, a first storage capacitor 24A is formed along a border area 26 between a first pixel group 12A and a second pixel group 12B that is adjacent to the first pixel group 12A. A second storage capacitor 24B is formed along a border area 26 between the second pixel group 12B and the first pixel group 12A that is adjacent to the second pixel group 12B.

Referring to FIGS. 12 and 13, the LCD includes a first semiconductor layer 40A of a thin film transistor 14 arranged in the first pixel group 12A. The first semiconductor layer 40A is angled in a substantially right-angle shape. However, the shape of the first semiconductor layer 40A is not limited to the right-angle shape as shown in FIG. 10. As shown FIG. 12, a first storage capacitor line 20 includes a first protruding portion 20a and a second protruding portion 20b. The reference numeral 60 represents a pixel electrode 60. In the exemplary embodiment, the pixel electrode 60 may include indium zinc oxide (IZO) or indium tin oxide (ITO). A first sub storage capacitor 24A1 is formed by the pixel electrode 60, the first protruding portion 20a, and an insulating layer (not shown) interposed between the pixel electrode 60 and the first protruding portion 20a. Also, a second sub storage capacitor 24A2 is formed by the pixel electrode 60, the second protruding portion 20b, and an insulating layer interposed between the pixel electrode 60 and the second protruding portion 20b. A third sub storage capacitor 24A2 is formed by the pixel electrode 60, portion of the first storage capacitor line 20, and an insulating layer interposed between the pixel electrode 60 and the portion of the first storage capacitor line 20. The first to third sub storage capacitors 24A1, 24A2, and 24A3 form a first storage capacitor 24A of the first pixel group 12A.

Also, as shown in FIG. 12, the LCD includes a second semiconductor layer 40B of a thin film transistor 14 arranged in a second pixel group 12B. In the exemplary embodiment, the second semiconductor layer 40B is angled in a substantially right-angle shape. However, the shape of the second semiconductor layer 40B is not limited to the right-angle shape as shown in FIG. 12. In FIG. 12, a second storage capacitor line 22 includes a third protruding portion 22a and a fourth protruding portion 22b. In the LCD 10 according to the exemplary embodiment, a fourth sub storage capacitor 24B1 is formed by the pixel electrode 60, the third protruding portion 22a, and an insulating layer (not shown) interposed between the pixel electrode 60 and the third protruding portion 22a. Also, a fifth sub storage capacitor 24B2 is formed by the pixel electrode 60, the fourth protruding portion 22b, and an insulating layer interposed between the pixel electrode 60 and the fourth protruding portion 22b. A sixth sub storage capacitor 24B2 is formed by the pixel electrode 60, portion of the second storage capacitor line 22, and an insulating layer interposed between the pixel electrode 60 and the portion of the second storage capacitor line 22. The fourth to sixth sub storage capacitors 24B1, 24B2, and 24B3 form a second storage capacitor 24B of the second pixel group 12B.

Since the first and second storage capacitors 24A and 24B include a non-transparent metal layer, the first and second storage capacitors 24A and 24B may serve as a light blocking part in each pixel.

As shown in FIG. 12, since the LCD according to the exemplary embodiment is provided with the first and second storage capacitors 24A and 24B each having three sub storage capacitors, the LCD 10 may have a sufficient storage capacitance. In the exemplary embodiment, the first and second semiconductor layers 40A and 40B include amorphous silicon and are formed in the substantially right-angle shape, however, shapes and materials of the first and second semiconductor layers 40A and 40B should not be limited to including the amorphous silicon and having the right-angle shape.

As shown in FIGS. 14 and 15, a thin film transistor substrate of the LCD includes a first substrate 48, a first protective layer 50, the first semiconductor layer 40A, a gate insulating layer 52, a gate line (a gate electrode) 16, ohmic contact layers 80 and 82, a source electrode 84, a drain electrode 86, a second protective layer 58, the pixel electrode 60, and a first alignment layer 62. Also, an opposite substrate of the LCD includes a second substrate 70, color filters 72A, 72B, and 72C, an opposite electrode 74, and a second alignment layer 76. The thin film transistor substrate and the opposite substrate are connected with each other with a spacer interposed therebetween, and a liquid crystal layer 64 is interposed between the thin film transistor substrate and the opposite substrate. Also, the second substrate 70 further includes a light blocking part 73 formed thereon.

In the exemplary embodiment, the first protective layer 50 includes a silicon nitride layer, the gate line (gate electrode) 16 includes molybdenum tantalum (MoTa), and the gate insulating layer 52 includes a silicon oxide layer. Also, the signal line 28 includes aluminum (Al), the second protective layer 58 includes a silicon nitride layer (SiN), the pixel electrode 60 includes ITO, and the first alignment layer 62 includes polyimide. However, materials of the above mentioned elements should not be limited to those materials.

According to the above, each pixel arranged along the predetermined direction includes the thin film transistor, and the gate line is extended along the center axis of the pixels to provide the driving signal to the gate of the thin film transistors of each pixels.

Also, the first storage capacitor line is arranged along one side of the pixels, and the first storage capacitor line is extended in a direction that is substantially parallel with the gate line. The first storage capacitors are connected between the thin film transistor of each pixel arranged in the first pixel group and the first storage capacitor line. Also, the second storage capacitor line is arranged along an opposite side of the pixels, and the second storage capacitor line is extended in a direction that is substantially parallel with the gate line. The second storage capacitors are connected between the thin film transistor of each pixel arranged in the second pixel group and the second storage capacitor line.

A storage capacitor line that is thicker than that of the gate line is arranged in the light blocking part between the pixels and a storage capacitor maintains the electric potential of the pixel. The storage capacitor is formed in the light blocking part between pixels. The size of the storage capacitor formed in the light transmitting region may be reduced, thereby increasing the aperture ratio of the pixels.

Although the exemplary embodiments of the present invention have been described, it is understood that the present invention should not be limited to these exemplary embodiments. Various changes and modifications can be made by one ordinary skilled in the art within the spirit and scope of the present invention.

What is claimed is:

1. A liquid crystal display comprising:
    a pixel group including a first pixel having a first thin film transistor and a second pixel having a second thin film transistor;
    a gate line applying a driving signal to a gate of the first and second thin film transistors;
    a first storage capacitor line arranged adjacent to one side of the first pixel and arranged substantially parallel with the gate line;
    a second storage capacitor line arranged adjacent to an opposite side of the first pixel, opposite to the one side of the first pixel, and arranged substantially parallel with the gate line;
    a first storage capacitor arranged in the first pixel and connected between the first thin film transistor and the first storage capacitor line; and
    a second storage capacitor arranged in the second pixel and connected between the second thin film transistor and the second storage capacitor line,
    wherein the first storage capacitor is formed in a border area between the first pixel and the second pixel that is adjacent to a right side of the first pixel, and the second storage capacitor is formed in a border area between the second pixel and the first pixel that is adjacent to a right side of the second pixel.

2. The liquid crystal display of claim 1, wherein the first pixel and the second pixel are alternately arranged.

3. The liquid crystal display of claim 1, wherein the first storage capacitor line comprises a first protruding portion and a second protruding portion, and the first storage capacitor comprises a first sub storage capacitor including a first semiconductor layer of the first thin film transistor, the first protruding portion, and an insulating material interposed between the first semiconductor layer and the first protruding portion and a second sub storage capacitor including the first semiconductor layer, the second protruding portion, and an insulating material interposed between the first semiconductor layer and the second protruding portion, and the second storage capacitor line comprises a third protruding portion and a fourth protruding portion, and the second storage capacitor comprises a third sub storage capacitor including a second semiconductor layer of the second thin film transistor, the third protruding portion, and an insulating material interposed between the second semiconductor layer and the third protruding portion and a fourth sub storage capacitor including the second semiconductor layer, the fourth protruding portion, and an insulating material interposed between the second semiconductor layer and the fourth protruding portion.

4. A liquid crystal display comprising:
    a pixel group including a first pixel having a first thin film transistor and a second pixel having a second thin film transistor;
    a gate line applying a driving signal to a gate of the first and second thin film transistors;
    a first storage capacitor line arranged adjacent to one side of the first pixel and arranged substantially parallel with the gate line;
    a second storage capacitor line arranged adjacent to an opposite side of the first pixel, opposite to the one side of the first pixel, and arranged substantially parallel with the gate line;
    a first storage capacitor arranged in the first pixel and connected between the first thin film transistor and the first storage capacitor line; and
    a second storage capacitor arranged in the second pixel and connected between the second thin film transistor and the second storage capacitor line,
    further comprising a driving circuit that applies a gate driving signal having a predetermined period to the gate line, applies a first signal synchronized with the gate driving signal to the first storage capacitor line, and applies a second signal having a phase opposite to the first signal to the second storage capacitor line.

5. A liquid crystal display comprising:
    a plurality of pixels arranged in a predetermined direction;
    a plurality of color filters arranged on the pixels corresponding to the pixels;
    a plurality of light blocking parts formed corresponding to a border area between the color filters adjacent to each other; and
    a plurality of storage capacitors each formed under a corresponding light blocking part, wherein each pixel comprises:
    a plurality of thin film transistors each of which drives a corresponding pixel of the plurality of pixels;
    a gate line connected to a gate of the thin film transistors and extended along a center axis of the pixels;
    a first storage capacitor line arranged substantially parallel with the gate line and arranged adjacent to one side of the pixels; and
    a second storage capacitor line arranged substantially parallel with the gate line and arranged adjacent to an opposite side that is opposite to the one side of the pixels, and the storage capacitors includes a plurality of first storage capacitors each of which is connected between the thin film transistor of a corresponding pixel and the first storage capacitor line and a plurality of second storage capacitors each of which is connected between the thin film transistor of a corresponding pixel and the second storage capacitor line.

6. The liquid crystal display of claim 5, wherein the first storage capacitors and the second storage capacitors are alternately arranged in the predetermined direction.

7. The liquid crystal display of claim 5, further comprising a driving circuit that applies a gate driving signal having a predetermined period to the gate line, applies a first signal synchronized with the gate driving signal to the first storage capacitor line, and applies a second signal having a phase opposite to the first signal to the second storage capacitor line.

8. The liquid crystal display of claim 5, wherein the first storage capacitors and the second storage capacitors have substantially the same capacitance.

9. A liquid crystal display comprising:
   a plurality of pixels arranged in a predetermined direction and each including a thin film transistor;
   a gate line providing a driving signal to a gate of the thin film transistor of each pixel, the gate line being arranged in a center of the pixels;
   a first storage capacitor line arranged substantially parallel with the gate line and arranged adjacent to one side of the pixels;
   a second storage capacitor line arranged substantially parallel with the gate line and arranged adjacent to an opposite side that is opposite to the one side of the pixels;
   a first storage capacitor arranged in a first pixel group of the pixels and connected between the thin film transistor of a corresponding pixel of the first pixel group and the first storage capacitor line;
   a second storage capacitor arranged in a second pixel group of the pixels and connected between the thin film transistor of a corresponding pixel of the second pixel group and the second storage capacitor line; and
   a driving circuit applying a first voltage, a second voltage, a third voltage, and a fourth voltage to the first and second storage capacitor lines, wherein the second voltage is smaller than the first voltage, the third voltage is smaller than the second voltage, and the fourth voltage is smaller than the third voltage.

10. The liquid crystal display of claim 9, wherein the driving circuit comprises:
    a voltage generation circuit generating the first, second, third, and fourth voltages;
    a first switch group applying the first, second, third, and fourth voltages, in that order, to the first storage capacitor line; and
    a second switch group applying the first, second, third, and fourth voltages, in that order, to the second storage capacitor line.

* * * * *